United States Patent Office 3,028,220
Patented Apr. 3, 1962

3,028,220
MANUFACTURE OF MANGANESE CARBONYL
Albert P. Giraitis and Harold E. Podall, Baton Rouge, La., assignors to Ethyl Corporation, New York, N.Y., a corporation of Delaware
No Drawing. Filed Jan. 7, 1960, Ser. No. 929
10 Claims. (Cl. 23—203)

This invention is concerned with manganese pentacarbonyl dimer and a process for its manufacture.

While the carbonyls of certain metals such as iron and nickel are rather readily prepared, those of manganese are very difficult to produce. For example, it has been reported in the literature that manganese pentacarbonyl dimer can be prepared by reacting a specially prepared form of manganese iodide containing copper with magnesium in diethyl ether under a high pressure of carbon monoxide. This procedure suffers particular disadvantages which prevent its employment on a commercial scale. In particular, the only manganese halide employable is manganese iodide prepared from the reaction of cuprous iodide with manganese metal. Likewise, as yet no substitute for highly volatile and flammable diethyl ether has been found. A still further disadvantage of the process is that the yields are low (only about 1 percent) and such low yields cannot be improved by increase in temperature and pressure.

Another procedure for the preparation of manganese pentacarbonyl dimer, although such was not produced apparently in recoverable yield, is the reaction of an ether suspension of manganese iodide with a Grignard reagent under pressure of carbon monoxide. This procedure has been improved somewhat by judicious choice of the Grignard reagents employed. However, even with these improvements the process suffers particular disadvantages which are to be overcome. For instance, for some unexplained reason the process is independent of variables such as pressure beyond a certain point. Essentially no change is obtained in the rate of reaction or in the yield when these variables are changed. A still further disadvantage of the process is that by-product metal is formed which cannot be converted to the desired carbonyl compound.

Still another procedure for the preparation of metal carbonyls which one might think to be applicable for the preparation of manganese pentacarbonyl dimer is the one involving reaction of the metal iodide with a metal reducing agent such as magnesium, sodium, calcium, and the like, and carbon monoxide. This method gives fair yields of chromium carbonyl. In the case of manganese under comparable conditions, e.g. employing sodium as the reducing agent, only metallic manganese and none of the carbonyl product is obtained. Even in the case of chromium, chromic iodide or a source of iodine must be employed to effect the desired reaction.

Accordingly, it is an object of this invention to provide a novel process for the manufacture of manganese pentacarbonyl dimer. Another object is to provide a process for its manufacture in high yields and purity. These and other objects will be apparent as the discussion proceeds.

The objects of this invention are attained by reacting simultaneously a cyclopentadienyl manganese tricarbonyl, and especially those containing cyclopentadienyl groups (including indenyl and fluorenyl groups) containing from 5–17 carbon atoms, with an alkali metal and carbon monoxide. In contrast to other processes, exceedingly high yields, from 20 to 50 percent under most conditions, can be obtained using this process. Although the benefits of this invention are generally realized when employing any of the alkali metals, sodium is particularly preferred because of its greater reactivity and economy.

When employing the procedure of this invention simultaneous reaction of the cyclopentadienyl manganese carbonyl, alkali metal and carbon monoxide is obtained thus providing an enhancement in yield, faster reaction rates and minimization of undesirable by-product materials. Other advantages of the process of this invention will be evident as the discussion proceeds.

The cyclopentadienyl manganese tricarbonyls employable in this invention can contain cyclopentadienyl groups substituted with groups inert to the alkali metals under the reaction conditions employed. Typical examples of cyclopentadienyl manganese tricarbonyl compounds which can be used in the process of this invention are cyclopentadienyl manganese tricarbonyl, methyl cyclopentadienyl manganese tricarbonyl, ethyl cyclopentadienyl manganese tricarbonyl, methyl ethyl cyclopentadienyl manganese tricarbonyl, phenyl cyclopentadienyl manganese tricarbonyl, benzyl cyclopentadienyl manganese tricarbonyl, cyclohexyl cyclopentadienyl manganese tricarbonyl and other compounds containing cyclopentadienyl groups having substituents such as 2-ethylhexyl, n-octyl, decyl, dodecyl, naphthyl, and the like.

The alkali metals employed in the process of this invention are those metals of the group I–A of the periodic table of the elements. Typical examples of such metals are sodium, potassium, lithium, rubidium, and cesium. Sodium, potassium, and lithium are preferred because of their high reactivity and greater availability. Sodium is especially preferred due to its lower cost and efficiency in the process. Such metals can be employed either in the solid or liquid state. When employed in the solid state, it is preferred that it be in finely divided form as for example below about 1000 microns in size. For such purposes the well known dispersions of such metals in suitable reaction media as described hereinafter are particularly well suited in the process. Such a technique results in the further advantage that the particle size of the metal can be below about 50 microns in size or averaging 20 or less microns in size.

In general, the process of this invention is readily performed by passing the cyclopentadienyl manganese tricarbonyl and the alkali metal in an appropriate solvent into a reaction vessel and pressurizing with carbon monoxide. The reaction mixture is usually stirred to provide adequate contact. In most instances the simultaneous reaction of these materials will take place at room temperature although heating is preferred to effect greater reaction rates. At the completion of the reaction the manganese carbonyl is recovered in a conventional manner such as distillation, sublimation or separation of the by-products leaving the product in the liquid medium, when employed, which can then be recovered by concentration and filtration.

The process of this invention will be more fully understood by reference to the following examples. In all examples, the parts and yields are by weight.

EXAMPLE I

To a reactor equipped with external heating means, internal agitation, means for maintaining pressure, and means for admitting and dispersing products was added 109 parts of methylcyclopentadienyl manganese tricarbonyl (MeCpMn(CO)$_3$), 34 parts of sodium of particle size below 50 microns as a 40 percent dispersion in Nujol, and 300 parts of the dimethyl ether of diethylene glycol. The reactor was then pressurized with 700 p.s.i. of carbon monoxide. It was then heated to 120 to 130° C. with continuous agitation. These conditions were maintained for 16 hours. At the end of this period the reaction mixture was quenched with aqueous hydrochloric acid at 25 to 65° C. under 500 p.s.i. of carbon monoxide. An additional 300 parts of water was added and the mixture was steam distilled to provide 45.7 parts of manganese pentacarbonyl dimer, or a 48 percent yield of the theoretical based on the starting manganese compound.

EXAMPLE II

To the reactor equipped as in Example I was added 54 parts of methylcyclopentadienyl manganese tricarbonyl, along with a 40 percent dispersion of 17 parts of finely divided sodium in Nujol in 65 parts of the dimethyl ether of diethylene glycol. The reactor was pressurized with 3000 p.s.i. of carbon monoxide and agitation commenced. The mixture was heated at 125° C. for 7 hours. At the end of this period the reaction mixture was quenched at atmospheric pressure with water and steam distilled. A 40 percent yield of manganese pentacarbonyl dimer was thereby obtained.

EXAMPLE III

The procedure of Example I was repeated with the exception that 54 parts of MeCpMn(CO)$_3$ was reacted with 8.5 parts of sodium, as a 40 percent dispersion in Nujol, in 90 parts of the dimethyl ether of diethylene glycol, and 3000 p.s.i. of carbon monoxide at 130° C. for 13.5 hours. A 13 percent yield of manganese pentacarbonyl dimer was thereby obtained.

EXAMPLE IV

The procedure of Example I was repeated with the exception that 54 parts of MeCpMn(CO)$_3$, 17 parts of sodium, and 3000 p.s.i. of CO in 85 parts of benzene were reacted at 200° C. for 4 hours and 20 minutes. A 15 percent yield of manganese pentacarbonyl dimer was obtained.

EXAMPLE V

The procedure of Example I is repeated with the exception that 63 parts of manganous chloride are reacted with 23 parts of finely divided sodium as a 40 percent dispersion in Nujol in 75 parts of the dimethyl ether of diethylene glycol containing 3 parts of sodium methylcyclopentadienide under a pressure of 3000 p.s.i. of carbon monoxide at 150° C. for 12 hours. Manganese pentacarbonyl dimer is thus obtained in high yield.

Other examples which illustrate the process of the present invention are given below, summarized in the following table. In each of these examples, the procedure and conditions employed are similar to those of Example I, except as otherwise noted.

rate and to achieve best results it is preferred to operate at a temperature between about 50 to 150° C. Similarly the pressure can be varied over a wide range from superatmospheric, as about 5000 p.s.i. to atmospheric pressures. Ordinarily pressures above atmospheric are employed. A preferred range is between about 500 to 3000 p.s.i.g. in order to obtain optimum results. The time of reaction will depend somewhat upon the conditions under which the reaction is conducted although times between 1 minute to 20 hours are generally quite adequate. In order to minimize side effects it is preferred to conduct the reaction for a period of from 5 minutes to 4 hours.

The proportions of the reactants can likewise be varied and generally are based on the starting manganese compound. In this connection between about 1 mole to 5 moles of the alkali metal are employed per mole of the cyclopentadienyl manganese tricarbonyl. However, as the temperature is increased the number of moles of alkali metal generally can be decreased to stoichiometric quantities. The carbon monoxide being in gaseous form is generally pressurized in the system in amounts sufficient to produce the manganese carbonyl. Large excesses can be employed without disadvantage since such excess is readily recovered and recycled for further use.

As demonstrated by the above examples, an organic diluent is usually employed and preferred. Generally speaking, such diluents should be essentially inert to the reactants. Among such organic diluents which can be employed are included the hydrocarbons, ethers and amines. Among the hydrocarbons included are for example, nonanes, octadecanes, hexanes, toluene, benzene, xylene, mesitylene and mixed hydrocarbons such as gasoline, diesel oil and the like petroleum fractions. Among the ethers employable are included, for example, the non-aromatics, aromatics, and polyethers including, for example, di-sec-butyl ether, di-n-heptyl ether, di-isopropyl ether, ethylisoamyl ether, methylphenyl ether (anisole), p-tolyl ether, ethylphenyl ether, dioxane, tetrahydrofuran, tetraethylene glycol dimethyl ether and the dimethyl, diethyl, and di-n-butyl ether of diethylene glycol. Among the amines which are employable are included dimethyl amine, diethyl amine, dioctyl amine, diphenyl amine, dicyclohexyl amine, methylethyl amine, p-methyl pyridine, o-methyl pyridine, 2,6-dimethyl pyridine, isoquinoline, trimethyl amine, triethyl amine, tributyl amine, tricyclohexyl amine, and the like.

*Table*

| Example Number | Manganese Compound | Alkali Metal | Solvent | CO, p.s.i.g. | Temp., ° C. | Mole Ratio, Alkali Metal to Manganese Compound |
| --- | --- | --- | --- | --- | --- | --- |
| VI | Cyclopentadienyl manganese tricarbonyl. | Sodium | Diethylene glycol diethyl ether. | 1,000 | 100 | 3 |
| VII | Phenyl cyclopentadienyl manganese tricarbonyl. | Potassium | Diisopropyl ether | 1,500 | 110 | 2.5 |
| VIII | Indenyl manganese tricarbonyl | Lithium | Mesitylene | 2,000 | 164 | 4 |
| IX | Methyl cyclopentadienyl manganese tricarbonyl. | Rubidium | Tetrahydrofuran | 2,500 | 60 | 3.5 |
| X | Butyl cyclopentadienyl manganese tricarbonyl. | Cesium | 2,6-dimethyl pyridine | 5,000 | 143 | 2 |

The temperature at which the reaction is conducted is important to the attainment of high yields. Usually a temperature between about −20 to 250° C. is employed although the higher the temperature the faster the reaction rate. For most effective results the reaction is conducted at a temperature when, in general, the rate of carbonylation is equal to or greater than the rate of reaction of the metal with the manganese compound. The temperature is somewhat dependent upon the metal and manganese compound used. In general, the more reactive the metal, the lower the temperature required for best results. Thus, in order to enhance the reaction The coordinating diluents, that is the ethers and amines, are particularly preferred since these materials exhibit a reaction promoting effect.

The aforementioned diluents are also well suited for the preparation of the alkali metal dispersions when employed. Such well-known dispersions are readily prepared by vigorous agitation of the alkali metal in the diluent at a temperature above the melting point of the alkali metal and subsequent cooling, although not necessary to below the melting point of the metal. Frequently, in the preparation of such dispersions it is desirable to employ well-known dispersing agents to maintain the metal in a dispersed form. Among such dispersing agents are the organic acids such as oleic acid, polymers such as polyethylene, carbon black, alcohols and the like. Such dispersions can be pre-formed or prepared in situ.

The process of this invention provides a manganese pentacarbonyl dimer which is of considerable use. A particularly advantageous use is as an additive to fuels for internal combustion engines and the like. For example, when sufficient manganous pentacarbonyl dimer is added to commercial gasoline to obtain compositions containing one gram of manganese per gallon the octane number of the gasoline is increased about 5 octane numbers. The product is also useful as a chemical intermediate in preparing other organometallic compounds. These and other uses will be evident to those skilled in the art.

Having thus described the process of this invention it is not intended that it be limited except as set forth in the following claims.

We claim:

1. A process for the manufacture of manganese pentacarbonyl dimer which comprises reacting a cyclopentadienyl hydrocarbon manganese tricarbonyl in which the cyclopentadienyl group contains 5–17 carbon atoms with an alkali metal and carbon monoxide at a temperature and a pressure sufficient to effect the reaction.

2. A process for the manufacture of manganese pentacarbonyl dimer which comprises reacting a cyclopentadienyl hydrocarbon manganese tricarbonyl in which the cyclopentadienyl group contains 5–17 carbon atoms with an alkali metal and carbon monoxide in an ether solvent at −20 to 200° C., said carbon monoxide being employed at pressures of 0 to 5000 p.s.i.

3. A process for the manufacture of manganese pentacarbonyl dimer which comprises reacting methylcyclopentadienyl manganese tricarbonyl with sodium dispersion and carbon monoxide in a glycol ether solvent at a temperature of 100 to 150° C., said carbon monoxide being employed at a pressure of 200 to 3500 p.s.i.

4. The process of claim 1 wherein said tricarbonyl is methylcyclopentadienyl manganese tricarbonyl.

5. The process of claim 1 wherein said tricarbonyl is cyclopentadienyl manganese tricarbonyl.

6. The process of claim 1 further characterized in that it is conducted in an inert organic diluent selected from the group consisting of hydrocarbons, ethers, amines and mixtures thereof.

7. The process of claim 1 wherein said alkali metal is sodium.

8. A process for the manufacture of manganese pentacarbonyl dimer characterized by the step of reacting a cyclopentadienyl hydrocarbon manganese tricarbonyl in which the cyclopentadienyl group contains 5–17 carbon atoms with an alkali metal and carbon monoxide at a temperature in the range of about 50 to about 150° C. and a pressure in the range of about 500 to about 3,000 p.s.i.g sufficient to effect said reaction.

9. The process of claim 8 further characterized in that said alkali metal is sodium.

10. The process of claim 8 further characterized in that said alkali metal is sodium, in that said tricarbonyl is methylcyclopentadienyl manganese tricarbonyl and in that the reaction is conducted in an ether.

References Cited in the file of this patent

UNITED STATES PATENTS 2,865,716    Hasek  ---------------- Dec. 23, 1958